May 5, 1953 R. J. BAUNACH 2,637,656
CORN POPPING MACHINE
Filed March 5, 1952 5 Sheets-Sheet 1

INVENTOR.
Roy J. Baunach
BY
Owen & Owen
ATTORNEYS

May 5, 1953

R. J. BAUNACH 2,637,656

CORN POPPING MACHINE

Filed March 5, 1952

INVENTOR.
Roy J. Baunach
BY
Owen + Owen
ATTORNEYS

May 5, 1953 R. J. BAUNACH 2,637,656
CORN POPPING MACHINE
Filed March 5, 1952 5 Sheets-Sheet 4

INVENTOR.
Roy J. Baunach
BY
Owen & Owen
ATTORNEYS

Patented May 5, 1953

2,637,656

UNITED STATES PATENT OFFICE 2,637,656

CORN POPPING MACHINE

Roy J. Baunach, Toledo, Ohio

Application March 5, 1952, Serial No. 274,938

13 Claims. (Cl. 99—238.1)

This invention relates to machines for popping corn and more particularly to a domestic corn popping machine designed for household use in the preparation of a quart or so of popped corn in each operation.

Present commercially available, domestic type, corn poppers usually consist in nothing more than a bowl, frequently having a rounded bottom, which is provided with a cover and a small electric heating unit located in a base on which the bowl is supported during the corn popping operation.

In popping corn on a device of this type it is necessary to pour a measured amount of popping oil and a measured amount of popcorn kernels into the bowl each time it is desired to prepare some popped corn. This necessitates keeping a bottle of oil and a jar or can or kernels on hand and, when the device is used, as it is frequently, in the living room of a home, taking these accessory supplies to the room with the corn popping device.

It is the principal object of this invention to provide a domestic type corn popper in which the supplies of unpopped corn kernels and popping oil are kept in the device.

It is another object of this invention to provide a corn popper having supply facilities for keeping unpopped kernels and oil on hand and provided with metering devices for charging the popping bowl with the appropriate quantities of both prior to each popping operation. If desired, salt may be maintained in the supply facilities and thus added to the popping bowl at the same charging time.

It is a still further object of this invention to provide a domestic type corn popper in which proper quantities of unpopped kernels and popping oil are metered into magazines by the same action required to open the popper for removal of the popped corn.

It is yet another object of this invention to provide a unitary corn popper comprising a heating element, popping bowl and a combination bowl cover and storage magazine which, when so actuated as to permit removal of popped corn from the popping bowl, automatically meters proper quantities of popcorn kernels and popping oil for a subsequent popping operation and which is provided with a single control that functions to charge both materials into the popping bowl at the initiation of a subsequent popping cycle.

These and more specific objects and advantages of the instant invention will be more fully understood from reference to the specification which follows and to the drawings, in which.

A preferred embodiment of the instant invention may comprise a hemispherical base 20 having an upwardly open re-entrant cup-like portion 21 in which is mounted a heating element 22. The heating element 22 is electrically connected by wires 23 to a conventional socket 24 for the reception of a conventional utility plug 25. If desired, a switch (not shown) may be mounted in the wall of the base 20 or in the heating cord 23 and in some constructions it may be desirable to include an automatic thermostat (not shown) to control the element 22 and maintain either an appropriate temperature for most satisfactory popping or to electrically disconnect the element 22 when the popping operation is completed.

The particular shape of the base 20 and re-entrant groove 21 are not in any way critical and cylindrical or other shapes may be employed in place of the particular shapes shown.

The base 20 may be provided with an inwardly turned bottom lip 26 to which a bottom plate 27 having, for example, insulating feet 28, may be secured. If desired, the generally annular space between the base 20 and the re-entrant cup-shaped portion 21 may be filled with heat insulating material such as spun glass or mineral wool.

A shoulder 29 formed at the upper junction of the exterior of the base 20 and the cup-shaped portion 21 is so formed as to receive a generally hemispherical popping bowl 30. An annular recess 31 may be shaped around the bowl 30 to position the bowl 30 in the base 20. Preferably the bottom of the bowl 30 continues its generally spherical shape beyond the recess 31 so that the popping oil will run to the bottom and the unpopped kernels of corn will also remain at the bottom of the bowl where they are closest to the heat generated by the unit 22. The popping bowl 30 is provided with a handle 32 by which it may be lifted from the base 20.

A pair of arms 33, one at each side and generally at the rear of the device (see also Fig. 4), extend through holes 34 in the base 20 and have flattened lower ends 35 which are mounted on the exterior of the cup-shaped portion 21 by fastening devices 36.

Figures 3, 4, 5:
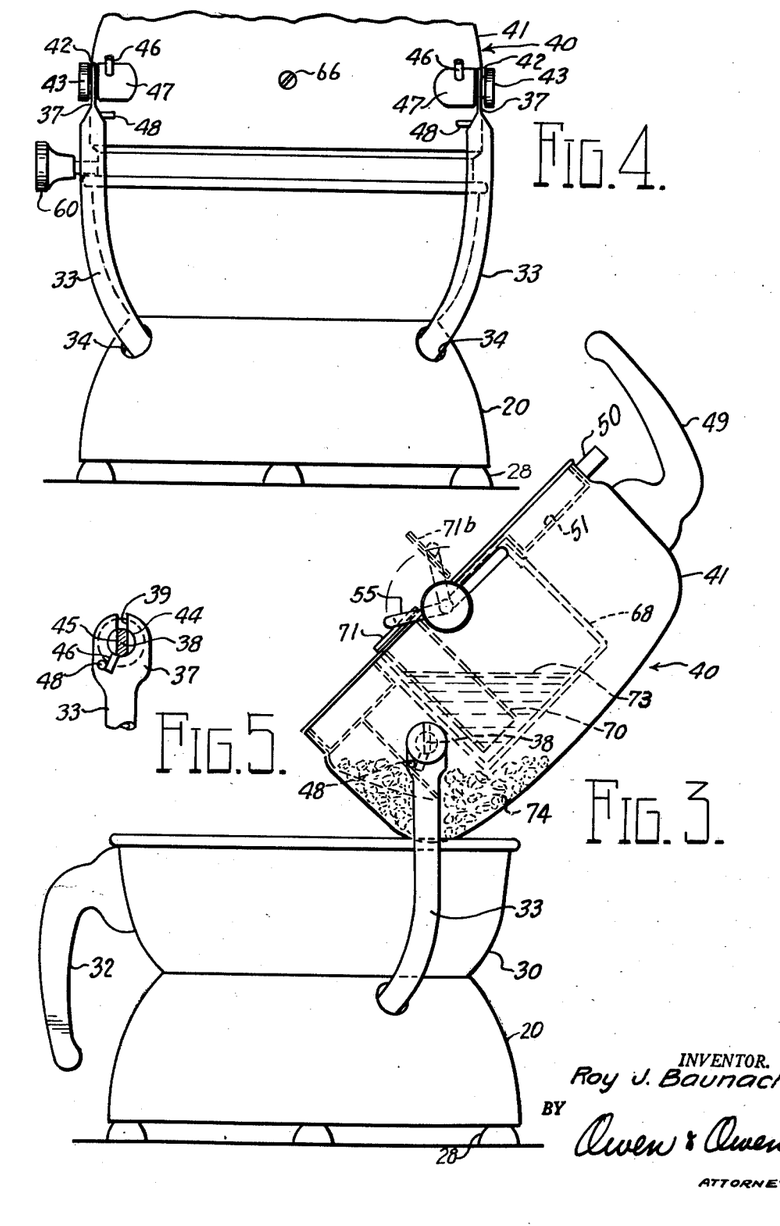
Fig. 3 is a view similar to Fig. 1 but showing the corn and oil storage and metering sections of the device in their open position to permit removal of a bowlful of popped corn and to accomplish metering for a subsequent popping operation.
Fig. 4 is a fragmentary view in elevation taken from the rear of the device, i. e., the right side of Fig. 1.
Fig. 5 is a fragmentary view in elevation on a slightly enlarged scale of mounting means for the metering unit shown in upper position in Fig. 3.

The upper ends of the arms 33 are flattened to provide ears 37 in which key-hole shaped openings 38 are punched, the slot-like portions 39 of the openings 38 extending upwardly through the margins of the ears 37 (see Fig. 5).

An upper section generally indicated by the reference number 40, which functions to store popcorn kernels and popping oil, to meter the kernels and the oil in measured charges, to charge the measured quantities of kernels and oil into the popping bowl 30 and as a lid or cover for the popping bowl 30, is mounted on the upper ends of the arms 33. The second 40 has an inverted dome-like housing 41 from the rear of which (Fig. 4) there laterally extends a pair of coaxial hinge pins 42. Each of the pins 42 has a flange 43 at its end and a reduced diameter section 44 (see Fig. 5) that is milled away to provide a diametric flat 45. The flat 45 rotates in the opening 38 in the ear 37 to serve as a pivot pin for the upper section 40 and slides through the slot 39 in the ear 37 of the support arm 33 when the section 40 is swung upwardly into the position shown in Fig. 3 to permit removal of the section 40.

Figure 1:
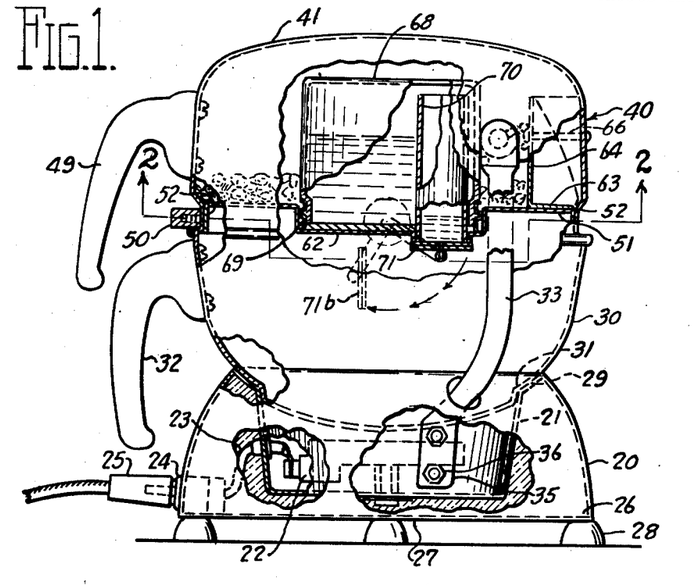
Fig. 1 is a view in elevation, with parts broken away and parts shown in section, of one embodiment of the instant invention.

A pair of positioning pins 46 are set in bosses 47 in which the hinge pins 42 are mounted and engage a pair of horizontally projecting pins 48 which are set or riveted in the ears 37 to act as stops for the upper section 40 when in the position shown in Fig. 3. A handle 49 similar to the handle 32 is secured at the front side of the upper section 40 to provide means for swinging it upwardy into the position shown in Fig. 3. A front stop 50 is riveted at the front of the rim of the housing 41 and rests upon the lip of the popping bowl 30 when the section 40 is down in covering position as shown in Fig. 1.

A bottom plate 51 for the housing 41 has a downwardly turned rim 52 which fits relatively snugly inside a vertically extending edge 53 of the housing 41. The rim 52 has a pair of diametrically opposed holes 54 (Fig. 2) through which project the ends of a wire bale 55. One end 56 of the bale 55 extends through one of the holes 54 and into a circumferentially extending horizontal slot 57 cut in the edge 53 of the housing 41 and the opposite end 58 of the bale 55 similarly extends through a second similar slot 59 at the opposite side of the housing 41. An actuating knob 60 is threaded on the end 58 of the bale 55. By moving the bale 55 longitudinally to the broken line position indicated by the reference character 60a in Fig. 2, its end 55 is disengaged from the slot 57. The bale 55 and plate 51 are then tilted downwardly to move the end 56 of the bale 55 beyond the edge 53 and, after unthreading the knob 60 from the end 58 of the bale 55, that end is disengaged from its slot 59 by moving the bale longitudinally in the other direction thereby permitting the removal of the plate 51.

The plate 51 also has a rectangular opening 61 cut through one edge and a concentric depression 62 at its center. The opening 61 is cut at one side of the plate 51 and located generally beneath the bottom 63 of a metering blade 64 which is secured along one side of the housing 41. The blade 64 also has end wings 65 and is held in place by a threaded pin 66, one end of which protrudes through the rear of the housing 41. An opening 67 is cut in the bottom 63 of the metering blade 64, the opening 67 being of the same size as the opening 61 in the bottom plate 51 but not in line therewith in the normal (solid line) position of the plate 51 and its hole 61 as shown in Fig. 2.

Figure 2:
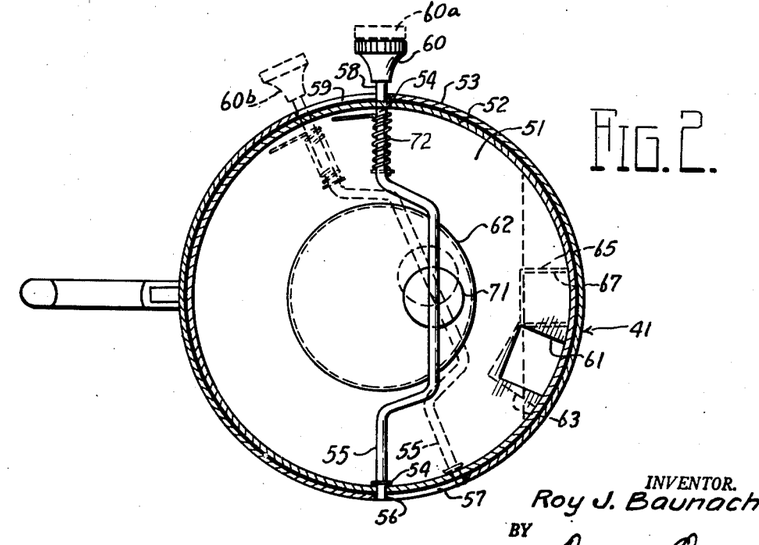
Fig. 2 is a horizontal sectional view taken substantially on the line 2—2 of Fig. 1.

In order to move the hole 61 in the plate 51 beneath the opening 67 in the bottom of the meter blade 64, an operator need only grasp the knob 60 and swing it to the broken line position indicated by the reference character 60b in Fig. 2, thus rotating the bale 55 to the position indicated as 55b and rotating the plate 51 a similar distance on a central vertical axis. This moves the opening 61 beneath the opening 67 and, as will later be explained, permits a charge of popcorn kernels to fall downwardly therethrough into the popping bowl 30.

An oil jar 68 is removably threaded into a form threading ring 69 that is fixed in the central depression 62 of the bottom plate 51. A tube 70 is soldered or otherwise secured to a cover plate 51 of the jar 68 near one of its sides. The tube 70 protrudes through the bottom of the depression 62 in the cover plate 51 and is capped by a movable stopper plate 71 which is mounted on the central portion of the bale 55. A coil spring 72 is wrapped around the bale 55 and biased to swing the bale to hold the stopper plate 71 in position to close the lower end of the tube 70. By rotating the knob 60 the cover plate 71 is swung to the position indicated by the broken line number 71b in Fig. 1, thus permitting only the oil located in the tube 70 to flow downwardly therefrom into the popping bowl 30.

To load the upper section 40 with oil and popcorn kernels it is swung upwardly into the position shown in Fig. 3 and then may be lifted off the arms 33 or, if the supplies of oil and popcorn are at hand, it may be filled while in this position. The first step in filling the section 40 is to remove the bottom plate 51 as explained above and to unthread the oil jar 68 from its threading ring 69. After filling the oil jar 68 it is held upright and the plate 51 replaced with respect to the jar 68. An appropriate charge of unpopped kernels and, if desired of salt, is poured into the inverted housing 41 and the cover plate 51 with the oil jar 68 is then replaced. Oil, indicated at 73 in Fig. 3, flows upwardly into the tube 70 and popcorn kernels indicated at 74 fall to the lowermost portion of the housing 41 and behind and beneath the metering blade 64. When it is desired to proceed with a popping cycle the upper section 40 is swung downwardly from the position shown in Fig. 3 to the position shown in Fig. 1. The operator then can rotate the knob 60 to dump the oil into the popping bowl 30 if he prefers to preheat the oil therein and subsequently moving the knob 60 to the position 60b thereby dump the popcorn kernels into the preheated bowl. If preferred, the kernels and oil may be dumped substantially simultaneously by rotating and swinging the knob 60 at the same time.

After the corn has been popped the operator swings the upper section 40 back into the position shown in Fig. 3 and removes the popping bowl 30 from the device. The corn may then be served either in the popping bowl 30 or emptied therefrom into a serving bowl. The operator then returns the popping bowl 30 to its position and swings the upper section 40 downwardly to recover the bowl 30 which again measures or meters an appropriate quantity of both oil and popcorn kernels so that, when desired, the knob 60 may be actuated to recharge the popping bowl 30.

The metering blade 64 has arcuate end walls 65 and is fabricated from flexible material so that by rotating the end of the pin 66 which protrudes through the wall of the housing 41 it can be flexed closer to or farther away from the wall of the housing 41 to vary the volume of the space behind the blade 64 and thus the quantity of unpopped corn which is charged during each cycle. This is necessary both because of the variations in the size of unpopped kernels depending upon the type of corn employed, and also because newer strains of popcorn have been developed which expand to a much greater comparable volume than older strains and since the volume of the expanded corn is limited by the volume of the popping bowl 30, provision is made for varying the initial quantity of unpopped corn.

In the embodiment of the invention just described, the popping bowl 30 is designed to be removed from the device to effect dumping of the popped corn. In the embodiment of the invention illustrated in Figs. 6 through 11, however, the popping bowl is designed to remain with the upper section of the device shown in those figures and is provided with a lateral opening through which the popped corn can be poured.

The device shown in Figs. 6 through 11 is a modification of the invention designed to simplify and render even more nearly automatic the operation of a corn popper embodying the invention. In this second modification a bowl shaped base 100 is supported by three evenly spaced legs 101, 102 and 103 to which it is secured by fasteners 104. A heating unit 105 is mounted in the bottom of the base 100 and electrically connected to a power line 106 through a leaf spring switch 107 that is mounted in the interior of the leg 101.

Figure 8:
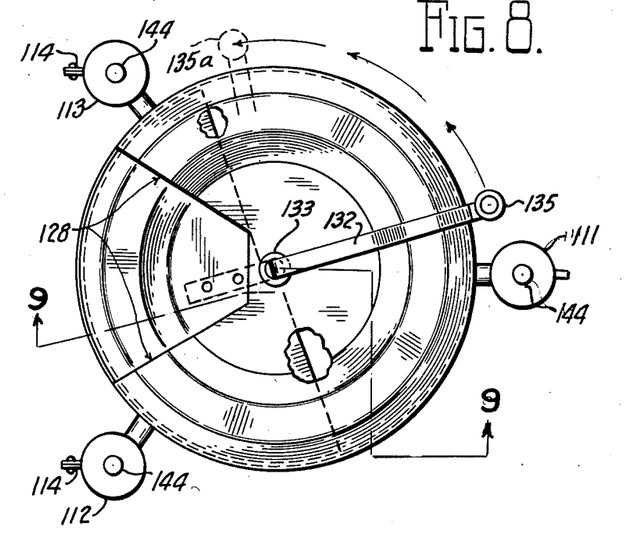
Fig. 8 is a plan view of the device shown in Fig. 6 with the uppermost section, i. e., the storage and metering section of the device, removed.
Figure 9:
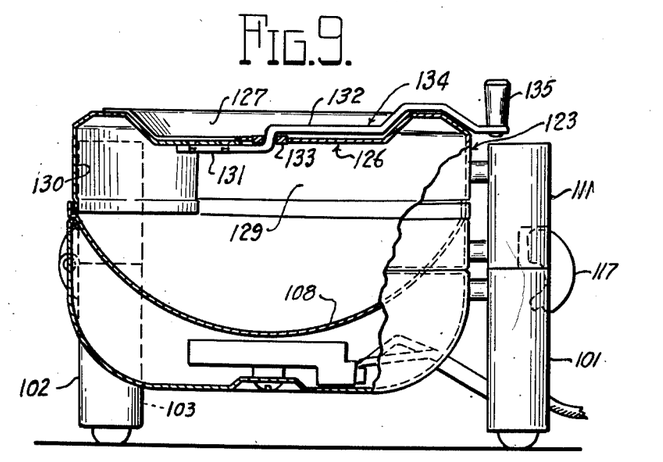
Fig. 9 is a vertical sectional view taken substantially along the line 9—9 of Fig. 8.

A hemispherically shaped popping bowl 108 (see also Fig. 9) is supported by an annular mounting ring 109 which is secured by fasteners 110 to three center leg sections 111, 112 and 113 (see also Fig. 8). The three leg sections 111, 112 and 113 correspond to and are spaced similarly with the three base leg sections 101, 102 and 103. The two rearwardly located central leg sections 112 and 113 are hingedly connected to their corresponding base leg sections 102 and 103 by hinges 114, the hinge line of which lies on the same horizontal plane as the line of separation between the pairs of leg sections 101—111, 102—112 and 103—113 and the junction line between the annular ring 109 and the base 100.

A slot 115 is cut in the front center leg section 111 and a horizontal pin 116 which extends across the leg pivotally mounts a switch actuating member 117. The lower end of the switch actuating member 117 extends downwardly into a slot 118 cut in the upper end of the front base leg section 101 so that a lobe 119 on the member 117 is in line to close the contacts of the leaf switch 107 when the member 117 is pressed inwardly. A catch pin 120 extends across the slot 118. A notch 121 cut in the edge of the switch actuating member 117 just to the rear of its contact closing lobe 119 engages the pin 120 when the switch actuating member 117 is pressed inwardly to close the switch. When the center section of the apparatus is swung upwardly on the hinges 114 for purposes to be later described, a small spring 122 mounted in the leg section 111 presses the actuating member 117 outwardly so that even though the leg section 111 is replaced in the position shown in Fig. 6, the switch 107 will not again be closed until the actuating member 117 is pressed inwardly.

The upper portion of the popping bowl unit which comprises the hemispherical bowl portion 108, consists in a generally cylindrical shell 123 which is mounted by studs 124 in the center leg sections 111, 112 and 113 and which has a lower lip 125 mating with the upper edge of the bowl 108. The shell 123 has an overlying top 126 (see also Fig. 9) having a depressed center portion 127. At the rear of the shell 123 a wedge shaped opening 128 is cut through the top 126 and side walls 129 of the shell 123. The opening 128 is normally closed by a sliding gate 130 whose contour matches that of the shell 123 and which is secured to an arm 131 of a lever 132 that extends upwardly through a bearing 133 at the center of the shell 123. The lever 132 has an opposite arm 134 which extends horizontally across the top surface of the shell 123 and protrudes laterally therefrom toward the front leg 111. An actuating handle 135 is secured at the outermost end of the arm 134. By swinging the handle 135 from the position shown in solid lines in Fig. 8 to the broken line position indicated by the reference character 135a, the gate 130 is swung around a distance such that it no longer obstructs the opening 128 so that after a bowl of popped corn has accumulated in the popping chamber composed of the hemispherical bowl 108 and shell 123, it can be dumped therefrom by swinging the popping chamber upwardly on the hinges 114 and allowing the popped corn to pour out of the opening 128 into a suitable receptacle.

The popping corn and oil storage and metering section of the device, as does that employed in the modification of the invention illustrated in Figs. 1 through 5 inclusive, has a dome shaped housing 136 containing an oil jar 137 and a bottom plate 138, for the storage of oil and corn respectively. The housing 136 is mounted by means of three sets of mounting studs 139—140 on three upper leg sections 141 at the front and 142 and 143 at the rear. Each of the leg sections 141, 142 and 143 corresponds to and rests upon the upper end of one of the center leg sections 111, 112 and 113 respectively. The pairs of leg sections 111—141, 112—142 and 113—143 are positioned relative to each other by positioning pins 144 which are studded into the upper ends of the leg sections 111, 112 and 113 and received in sockets drilled in the lower ends of the upper leg sections 141, 142 and 143.

The bottom plate 138 of the storage section of the device is retained in the housing 136 by an annular retaining ring 145. The ring 145 (see Figs. 6 and 7) is held in place by the engagement with its undersurface of the inner protruding ends of the studs 140 which underlie its edge. The ring 145, however, can be removed from engagement with the studs 140 by rotating it sufficiently to bring two notches 146 (Fig. 7) in line with the inner ends of two studs 140 on the leg sections 142 and 143 and then tilting the ring 145 so as to disengage the end of the stud 140 from the leg 141 therefrom.

The bottom plate 138 has an opening 147 at its rear behind a kernel metering blade 148 which is fixed to the upper surface of the plate 138. The plate 138 also has a central depression 149 in which a mounting ring 150 is secured for holding the oil jar 137 in place. A metering tube 150 is fixed in the depression 149, extending downwardly through the plate 138 and upwardly into the interior of the oil jar 137. The lower end of the tube 150 is closed by a stopper 151 which is fixedly mounted upon a crank shaft 152 that extends beneath the depression 149 between two ears 153 that are riveted or otherwise secured to the plate 138. The crank 152 has an upwardly extending finger 154 that is engaged by the end of an arm 155 which is riveted to the retaining ring 145 and which extends outwardly beyond the lip of the housing 136 carrying an actuating handle 156 on its outermost end. A spring 157 is coiled around the crank 152 and is biased to swing the stopper 151 upwardly against the lower end of the tube 150.

The ring 145 is pierced by a pair of holes 158 and 159 so located as to be swung around beneath the opening 147 in the plate 138.

The plate 138 is restrained against rotation when the retaining ring 145 is rotated, by engagement between the ends of the studs 140 and vertical notches 160 cut in its depending rim 161.

By reason of the connecting pins 144 extending into the two sets of center section legs 111, 112 and 113 and corresponding upper section legs 141, 142 and 143, the center or popping unit and the upper or storage and metering unit, are swung together on the hinges 114 when it is desired to dump popped corn from the popping chamber and to recharge the kernel and oil metering elements of the device. This position is illustrated in Fig. 10 of the drawings where the two uppermost sections are shown as swung up and to the left and dumping popped corn into a receptacle fragmentarily shown at 162.

When it is desired to perform a corn popping operation the operator first swings the handle 135 in a counterclockwise direction as shown in Fig. 8, which moves the gate 130 to clear the opening 128 in the shell 123. The operator then grasps the center section and upper section legs 111 and 141 and swings the center section and upper section of the unit around the hinges 114 to the position shown in Fig. 10. If previously popped corn is located in the corn popping chamber this motion dumps the popped corn therefrom as explained above. This same motion causes the kernels of unpopped corn to fall behind the metering blade 148 and oil to enter the metering tube 150.

Figure 6:
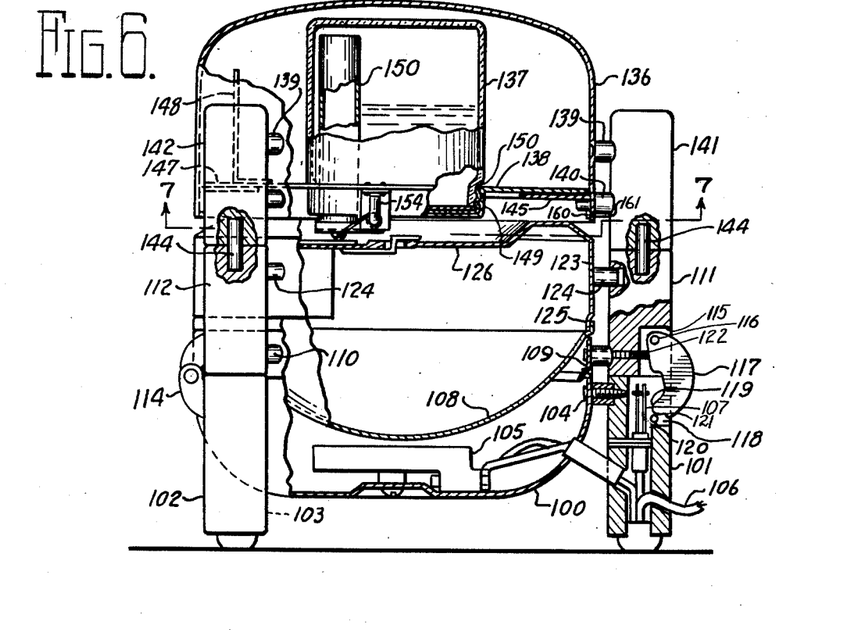
Fig. 6 is a side view in elevation with parts broken away and parts in section of a second embodiment of the invention.
Figure 7:
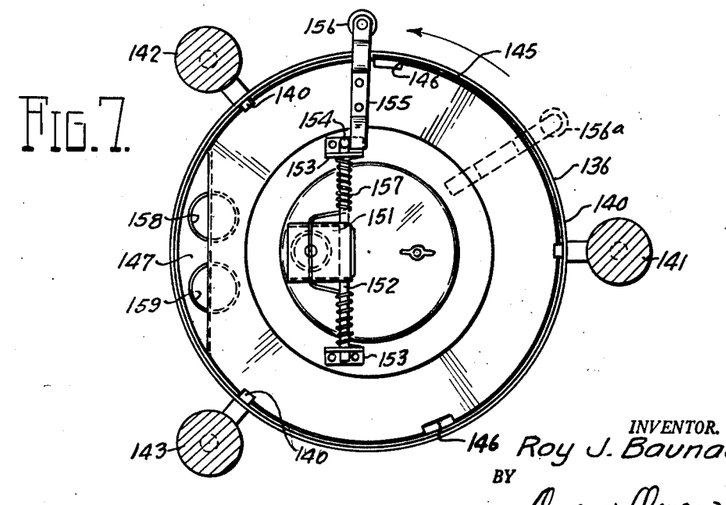
Fig. 7 is a horizontal sectional view taken substantially on the line 7—7 of Fig. 6.

When the operator returns the center and upper sections of the device to the position shown in Fig. 6, the measured amount of unpopped kernels and oil remains either behind the measuring blade 148 or in the metering tube 150. The operator then swings the handle 156 in a counterclockwise direction (Fig. 7) from the position shown in the broken lines in that figure where the knob is indicated as 156a (which is the normal position thereof) to the position shown in solid lines in Fig. 7. At this point the two holes 158—159 in the ring 145 lie beneath the opening 147 in the plate 138 and kernels of corn fall downwardly through the holes 158 and 159 and through the opening 128 into the interior of the popping chamber and into the popping bowl 108. By moving the handle 156 and the retaining ring 145 slightly further in a counterclockwise direction beyond the position shown in Fig. 7, the end of the arm 155 strikes the finger 154 on the crank 152 and swings the stopper 151 downwardly opening the bottom of the metering tube 150 and allowing the charge of oil therein to pour into the popping bowl 108.

Figure 10:
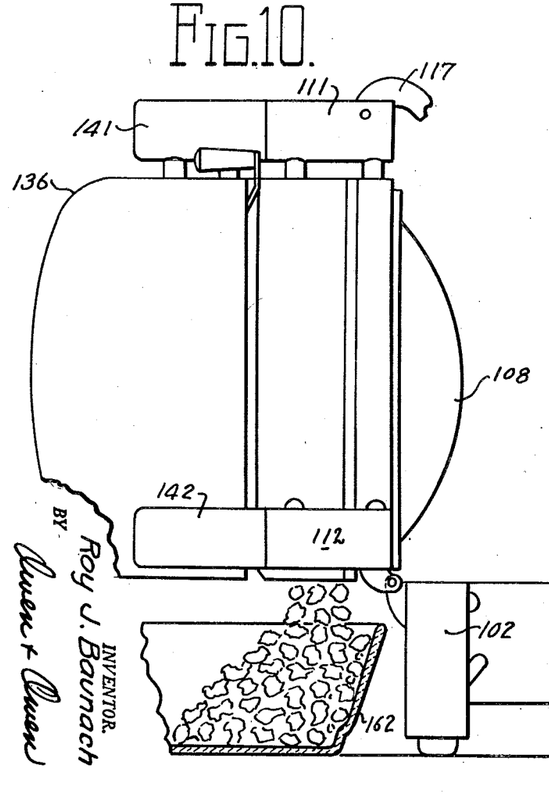
Fig. 10 is a side view in elevation similar to Fig. 1 but showing the device with its popping bowl and corn metering sections swung into upper position in which the popped corn is emptied from the popping bowl and unpopped kernels and popping oil are metered for a subsequent popping operation.

The operator then returns the handle 135 to the position shown in solid lines in Figs. 8 and 10, closing the opening 128 with the gate 130. Preferably, he also returns the handle 156 to its normal position swinging the popcorn holes 158—159 away from beneath the opening 147 in the plate 138.

The operator then presses inwardly on the switch actuating member 117, the lobe 119 camming the switch element 117 and the middle and upper sections of the device upwardly slightly to allow the pin 120 to enter the notch 121, and the lobe 119 striking the two leaf contacts 107 closing the electrical circuit. If desired, of course, the switch 117 may be closed before the kernels of corn and oil are dumped into the popping bowl 108 so that the bowl is hot before they are received therein.

When the popcorn kernels dumped into the popping chamber are all popped, the operator opens the popping chamber by swinging the handle 135 to move the gate 130 as explained above and dumps the popped corn from the device. This opens the electrical circuit, recharges the oil and popcorn kernels into their respective metering device and prepares the device for a subsequent popping cycle which can be initiated by dumping the corn and oil into the popping chamber and closing the electrical switch.

Although the two embodiments of my invention disclosed and described therein differ in that the first embodiment has a corn popping bowl that is removable from the device for the purpose of emptying the corn popped therefrom, whereas in the second device the corn popping chamber and the bowl 108 remain in the device and the corn popped is dumped therefrom; the basic operation of so moving a popping bowl or popping chamber to pour the popped corn therefrom or to otherwise permit its removal, accomplishes the unexpected result in a corn popper of the instant invention of metering a predetermined amount of both corn and oil from a storage means provided in the device itself.

The structure of the first embodiment disclosed, i. e., that of Figs. 1 through 5, is easily adaptable to use with almost any type of conventional electric stove and bowl. The two arms would be straightened and fastened to a flat plate on which a conventional heater would rest and a conventional bowl on the heater placed beneath the upper movable storage and metering unit which is shown in its upper position in Fig. 3. This suggested construction is shown in small scale in Fig. 11.

Figure 11:
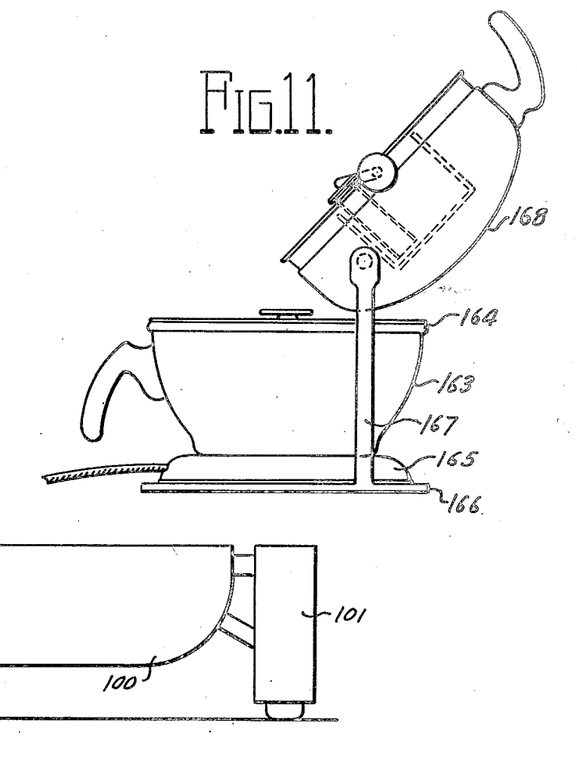
Fig. 11 is a side view in elevation of a further modification of the invention in which a corn and oil storage and metering unit embodying the invention is shown in use with a conventional corn popper of the prior art.

In Fig. 11 there is shown a conventional corn popper of the prior art having a pan-like corn popping bowl 163 provided with a removable cover 164 and mounted upon a conventional electric heating unit 165. The heating unit 165 is shown as resting upon a base plate 166 which supports a pair of legs 167 between the upper ends of which there is hinged a corn storage and metering unit 168 embodying the invention and substantially identical with the upper corn storage and metering element of the embodiment of the invention disclosed in Figs. 1 through 5. Because of the use of the separate lid 164 it is not necessary that the metering and storage device 168 should closely fit the top of the conventional corn popping bowl 163 although the majority of bowls available in corn poppers of this type are of substantially the same dimensions. Thus in most instances it will not be necessary to employ the separate cover 164 and the corn popping and metering unit 168 can serve as the lid of the popping bowl just as it does in the embodiments of the invention disclosed in Figs. 1 through 5.

A further modification in the structure which is simple in nature and within the scope of the invention is a device according to the embodiment of Figs. 6 through 10 in which the storage section and popping section, i. e., the upper and central sections of the device that are shown in tilted positions in Fig. 10, are physically separable from the lowermost burner section. This easily is accomplished, for example, by making the pins of the hinges 114 removable or by eliminating the hinges 114 so that the two uppermost sections are merely lifted off the bottom section. A slight modification in the structure of the popping bowl could provide it with a pouring opening that would be opened when it is lifted off the base section.

Thus, as in the embodiment of Figs. 6-10, inclusive, pouring out the popped corn would recharge the metering devices for a subsequent popping operation.

Having described the invention, I claim:

1. Kernel and oil storage and charging mechanism for a corn popping machine having a popping bowl and means for heating the same, said mechanism comprising a housing, means for mounting said housing in a first position overlying said bowl and for movement to a second position effectuating removal of popped corn from said bowl, there being kernel and oil storage chambers in said housing, a sub-chamber in each of said storage chambers into which kernels and oil respectively are metered upon movement of said housing between said positions and means for charging kernels and oil from said sub-chambers into said bowl when said housing is in its first position.

2. In a corn popper, in combination, a corn popping chamber, a kernel storage chamber, a popping oil storage chamber, means for mounting said storage chambers in first positions overlying said corn popping chamber and providing for movement to second positions for effectuating removal of popped corn from said popping chamber, means actuated upon movement of said storage chambers from one of said positions to the other of said positions for metering a measured quantity of kernels and of oil from said storage chambers and means for charging such measured quantities into said popping chamber when said storage chambers are in their first positions.

3. In a corn popper, in combination, an upwardly open corn popping chamber, a kernel storage chamber, a popping oil storage chamber, a housing containing said storage chambers, means for mounting said housing in a first position at least partially overlying said popping chamber and providing for movement of said housing to a second position effectuating removal of popped corn from said popping chamber, means operable by movement of said housing between said positions for metering a measured quantity of kernels and of oil from said storage chambers, and means for charging such measured quantities into said popping chamber when said housing is in its first position.

4. In a corn popper, in combination, an upwardly open corn popping chamber, a kernel storage chamber, a popping oil storage chamber, a housing containing said storage chambers, a standard adjacent said popping chamber, means on said standard for mounting said housing in a first position overlying said popping chamber and providing for movement of said housing to a second position generally inverted and away from said first position for effectuating removal of popped corn from said popping chamber, metering means in each of said storage chambers for isolating measured quantities of kernels and oil from the mass in such storage chambers upon tilting of said housing and means for charging such measured quantities into said popping chamber.

5. In a corn popping machine having an open topped corn popping chamber and means for heating the same, in combintaion, a generally dome shaped housing containing a popping oil storage chamber and a kernel storage chamber, means for mounting said housing for movement between a first generally horizontal position overlying said popping chamber and a second at least partially inverted position effectuating removal of popped corn from said popping chamber, a sub-chamber near that edge of each of said storage chambers lowermost when said housing is in second position and open to its respective chamber at its end uppermost when said housing is in first position, and means for charging the kernels and oil only from said sub-chambers when said housing is in first position.

6. In a corn popping machine having an open topped corn popping chamber and means for heating the same, in combination, a generally dome shaped housing containing a popping oil storage chamber and a kernel storage chamber, said housing having a first position in which it extends generally horizontally over said popping chamber and a second position in which it is swung into generally inverted position effectuating removal of popped corn from said popping chamber, means for mounting said housing for movement between said positions and for supporting said housing at least in its upper position, a sub-chamber near that edge of each of said storage chambers lowermost when said housing is in second position and open to its respective chamber at its end uppermost when said housing is in first position, a valved opening from each of said sub-chambers both of which overlie said popping chamber when said housing is in first position, and means for opening each of said valves for charging the kernels and oil therefrom into said popping chamber.

7. In a corn popping machine having an open topped corn popping chamber and means for heating the same, in combination, a generally dome shaped housing containing a popping oil storage chamber and a kernel storage chamber, said housing having a first position in which it extends generally horizontally over said popping chamber and a second position in which it is swung up into generally vertical position effectuating removal of popped corn from said popping chamber, means for mounting said housing for movement between said positions and for supporting said housing at least in its upper position, a sub-chamber near that edge of each of said storage chambers lowermost when said housing is in second position and open to its respective chamber at its end uppermost when said housing is in first position, a valved opening at the bottom of each of said sub-chambers, and manually operable means for operating said valves for charging kernels and popping oil into said popping chamber from said storage chambers.

8. A corn popper comprising an upwardly open corn popping bowl, a standard adjacent thereto, an inverted bowl shaped housing mounted on said standard and movable between a generally horizontal position above and overlying said bowl to a position effecuating removal of popped corn from said bowl, said housing including a kernel storage chamber having a sub-chamber near one side thereof and an opening from said sub-chamber, an oil storage chamber also having a sub-chamber therein at the same side thereof and having an opening from said sub-chamber, and manually operable valve means for said openings, whereby the movement of said housing away from its horizontal position meters a quantity of kernels and oil into said sub-chambers which is available for charging into said popping chamber.

9. A device according to claim 8 in which the kernel storage chamber is formed by the housing and the housing is closed by a bottom plate having openings therein and the valve means for said kernel storage chamber consists of a rotatable member movable beneath the openings in said plate.

10. A device according to claim 8 in which a single manually operable member controls both the valve means selectively.

11. A corn popper having a bowl shaped popping chamber and means for heating the same, an inverted dome shaped housing, a standard for swingingly mounting said housing for movement between a generally horizontal position closely overlying said bowl and an upwardly inclined position on a horizontal hinge lying near one edge of said bowl, a generally diametric housing closure plate having openings near the hinge side of said housing, a partial partition in said housing located radially inwardly of the openings in said closure plate and extending from said closure plate toward the top of said housing, an inverted oil storage container in said housing, a tubular well in said container located adjacent the hinge side thereof, having an open top communicating with said container, said well extending through said housing closure plate, and valve means for said well and for the openings in said closure plate, whereby swinging said housing between its horizontal and upper positions spills kernels and oil over said partition and the upper edge of said well, respectively, into the spaces on the lower sides thereof and return to horizontal position returns the remainder of kernels and oil to the general storage chambers.

12. A corn popper according to claim 11 in which the popping bowl swings with the housing and has a gate on its hinge side through which popped corn is poured upon swinging said housing and bowl to upper position.

13. A corn popper according to claim 11 in which the housing alone is hinged on the standard and when swung into upper position separates from the popping bowl for effectuating removal of popped corn therefrom.

ROY J. BAUNACH.

References Cited in the file of this patent

UNITED STATES PATENTS

| Number | Name | Date |
|---|---|---|
| 1,009,924 | Moores | Nov. 28, 1911 |
| 1,436,400 | Mabey | Nov. 21, 1922 |
| 1,545,357 | Schwimmer | July 7, 1925 |
| 2,108,627 | Tyler | Feb. 15, 1938 |
| 2,549,449 | Gibson | Apr. 17, 1951 |